United States Patent [19]

Mann

[11] Patent Number: 5,388,052
[45] Date of Patent: Feb. 7, 1995

[54] METHOD OF OPERATING AN INDUCTION MOTOR

[75] Inventor: Michael Mann, Berlin, Germany

[73] Assignee: Otis Elevator Company, Farmington, Conn.

[21] Appl. No.: 41,017

[22] Filed: Mar. 31, 1993

[51] Int. Cl.[6] .................. G01R 19/22; H02P 5/40; H02M 7/217
[52] U.S. Cl. .................... 364/483; 318/800; 318/805; 187/391; 363/98
[58] Field of Search ........... 364/483, 567, 492, 551.02; 318/800, 717; 310/17; 187/106, 119, 113, 130, 35; 74/89.15; 363/98, 132

[56] References Cited

U.S. PATENT DOCUMENTS

| | | | |
|---|---|---|---|
| 3,737,747 | 6/1973 | Krauer | 318/717 |
| 4,330,836 | 5/1982 | Donofrio et al. | 364/567 |
| 4,355,704 | 10/1982 | Mäkinen | 187/113 |
| 4,364,453 | 12/1982 | Serina | 187/113 |
| 4,623,042 | 11/1986 | Kamaike | 187/119 |
| 4,635,491 | 1/1987 | Yamano et al. | 74/89.15 |
| 4,766,977 | 8/1988 | Yamasaki | 187/106 |
| 4,926,105 | 5/1990 | Mischenko et al. | 318/800 |
| 5,270,594 | 12/1993 | Hulsing, II | 310/17 |

*Primary Examiner*—Emanuel T. Voeltz
*Assistant Examiner*—Alan Tran

[57] ABSTRACT

All N parameters of an induction machine equivalent circuit may be determined by providing a stator voltage such that the induction machine produces no torque, measuring a stator current for at least $N-1$ frequencies, determining the tangent of the angle $\phi$ between the stator voltage and stator current at said frequencies, and solving $N-1$ equations $R(\omega)\tan\phi + X(\omega) = 0$, given one of the parameters, said frequency values and said associated values for tangent $\phi$, where $R(\omega)$ and $X(\omega)$ are the real and imaginary components of the complex stator impedance of the induction machine.

5 Claims, 4 Drawing Sheets

METHOD OF OPERATING AN INDUCTION MOTOR

TECHNICAL FIELD

The present invention relates to identification of induction motor electrical parameters and operating the motor in response thereto.

BACKGROUND OF THE INVENTION

Many elevators use induction motor drives with inverters, either with U/f-characteristic (voltage or frequency) or vector control. These drives guarantee high riding comfort and short flight times because elevator velocity follows its reference without any significant deviation.

To obtain the advantages of this control method it is necessary to adjust the drive controller according to characteristics of the controlled motor. It is possible but not optimal to run some drives with default values. In many cases, especially with unknown machines, it is better to adjust the controller. This adjustment could be done either manually by "trial and error" or with the help of a motor parameter identification algorithm which measures electrical motor characteristics automatically and then calculates the desired controller values. This identification is done once before the elevator is set into operation the first time and therefore has to operate during standstill. During elevator operation time-invariant parameters are adapted with the help of a motor parameter adaptation algorithm (see copending patent application entitled "Rotor Time Constant Adaptation for Induction Motor in Vector Controlled Elevator Drive" by M. Mann, K. -H. Glahe).

There exist many algorithms to identify motor parameters but they are usually not suitable to elevator drives. Either they operate when the motor is running or they use the motor stator voltage which is normally not measured at elevators (see "Self-Commissioning—A Novel Feature of Modern Inverter-Fed Induction Motor Drives," H. Schierling, Siemens AG, Federal Republic of Germany; and "Selbsteinstellendes and selbstanpassendes Antriebsregelsystem für die Asynchronmaschine mit Pulswechselrichter," H. Schierling, Dissertation 1987, pages 61–66, Technical University of Darmstadt, Federal Republic of Germany).

While the machine is stationary, only relatively small voltages can be applied. In these cases the pulse-controlled inverter shows large relative errors between the set voltage and the preset desired value. It is conceivable to correct this error during identification if one has an exact knowledge of the frequency converter, but then the procedure would no longer by generally applicable to various frequency converters. Furthermore, that procedure is subject to temperature-dependent and temporal changes.

These preliminary considerations result in the demand for an identification procedure without a knowledge of the motor stator voltage.

DISCLOSURE OF THIS INVENTION

The object of the present invention is to identify four induction machine parameters, given one of them.

One advantage of the present invention is that induction machine parameters are obtained without measuring the stator voltage.

According to the present invention, all N parameters of an induction machine equivalent circuit may be determined by providing a stator voltage such that the induction machine produces no torque, measuring a stator current for at least $N-1$ frequencies, determining the tangent of the angle $\phi$ between the stator voltage and stator current at said frequencies, and solving $N-1$ equations $R(\omega)\tan\omega + X(\omega) = 0$, given one of the parameters, said frequency values and said associated values for tangent $\phi$, where $R(\omega)$ and $X(\omega)$ are the real and imaginary components of the complex stator impedance of the induction machine.

More specifically, a rectangular voltage fed to an induction machine stator such that no torque is produced and, using only a stator current as a measured input, a tangent $\phi$ of an angle between the stator voltage and stator current at three (or more) frequencies is determined and, given those frequencies, the associated tangent $\omega$ and the total leakage inductance $L_\sigma$, three (or more) non-linear equations $R(\omega)\tan\phi + X(\omega) = 0$ are solved, yielding the remaining three parameters of the induction machine equivalent circuit, the rotor time constant $\tau_2$, the rotor resistance $R_1$, and the parameter $L_R$, which is equal to $L_H^2/R_2$. Still more specifically, these three values are the stator resistance $R_1$, rotor time constant $\tau_2$, and a parameter $L_R = L_H^2/R_2$, where $L_H$ is a main inductance of an induction motor.

BEST MODE FOR CARRYING OUT THE INVENTION

Symbols

A subscript of 1 denotes a stator value. A subscript of 2 denotes a rotor value.

$Z(\omega)$ complex stator impedance
$\tau_2$ rotor time constant
$\phi$ angle between stator current and stator voltage
T period of stator current
IM induction motor
$X(\omega)$ imaginary part of stator impedance
$L_\sigma$ total leakage inductance
$L_{1\sigma}$ stator leakage inductance
$L_{2\sigma}$ rotor leakage inductance
$L_1$ stator inductance
$L_2$ rotor inductance
$L_R$ $L_H^2/R_2$
$L_H$ main inductance
$U_{1a}$ stator voltage
$U_{1b}$ stator voltage
$i_{1a}$ stator current
$i_{1b}$ stator current
$R(\omega)$ real part of stator impedance
$R_1$ stator resistance $R_2$ rotor resistance
$\omega$ fundamental frequency of stator voltage
$\omega_2$ slip frequency
$\Psi_{2b}$ stator flux
$\Psi_{2a}$ stator flux

Machine Model

The identification algorithm is based on an induction motor model which is a little different from a conventional one as described in "Control of Electrical Drives" W. Leonhard, Springer-Verlag (Springer Publishing), Berlin, Heidelberg, New York, Tokyo, 1985. The following equations show the model used for this invention. It describes an induction motor at standstill in stator fixed coordinates using a coordinate system with the axes (a) and (b), where (a) equals one motor phase R for a three-phase motor having lines R, S, T.

$$\frac{d}{dt}\begin{pmatrix} L_\sigma i_{1a} \\ \Psi_{2a}' \end{pmatrix} = \begin{pmatrix} -R_1 - L_R/\tau_2^2 & 1/\tau_2 \\ L_R/\tau_2^2 & -1/\tau_2 \end{pmatrix} \begin{pmatrix} i_{1a} \\ \Psi_{2a}' \end{pmatrix} + \begin{pmatrix} u_{1a} \\ 0 \end{pmatrix} \quad (1)$$

$$\frac{d}{dt}\begin{pmatrix} L_\sigma i_{1b} \\ \Psi_{2b}' \end{pmatrix} = \begin{pmatrix} -R_1 - L_R/\tau_2^2 & 1/\tau_2 \\ L_R/\tau_2^2 & -1/\tau_2 \end{pmatrix} \begin{pmatrix} i_{1b} \\ \Psi_{2b}' \end{pmatrix} + \begin{pmatrix} u_{1b} \\ 0 \end{pmatrix} \quad (2)$$

Figure 1:
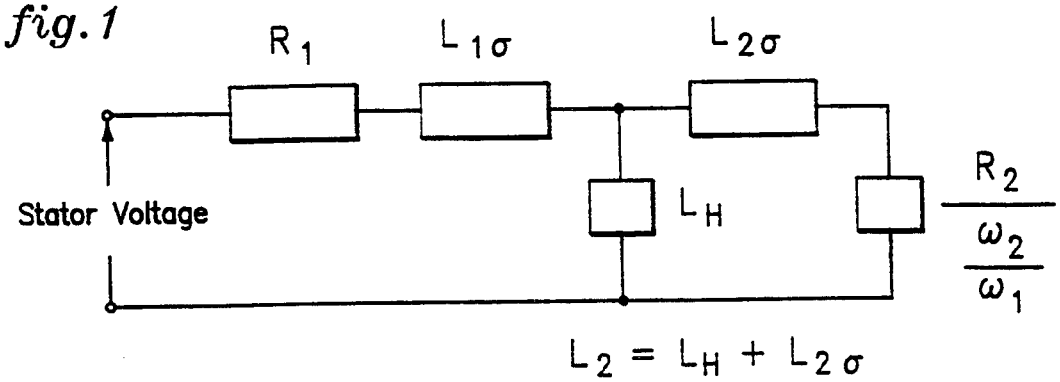
FIG. 1 is an induction motor equivalent circuit.

This model can be used to adjust the drive controller of an inverter controlled elevator. As shown in (1) and (2), there are four parameters used for a complete model description. These parameters are the stator resistance $R_1$, rotor time constant $\tau_2$, total leakage inductance $L_\sigma$ and the parameter $L_R$ which is not used in conventional models but can be derived from them. $L_R = L_H^2/R_2$, where $L_H$ is the main inductance and $R_2$ is the rotor resistance. The equivalent circuit is shown in FIG. 1.

The total leakage inductance $L_\sigma$ is identified by using an algorithm which is not a part of this invention but is described in "Self-Commissioning—A Novel Feature of Modern Inverter-Fed Induction Motor Drives," H. Schierling, Siemens AG, Federal Republic of Germany; and "Selbsteinstellendes and selbstanpassendes Antriebsregelsystem für die Asynchronmaschine mit Pulswechselrichter," H. Schierling, Dissertation 1987, pages 61–66, Technical University of Darmstadt, Federal Republic of Germany.

Identification of the Total Leakage Inductance $L_\sigma$

If in equation (1) one set $i_{1a} = 0$ and $\Psi_{2a}' = 0$, then the system of equations is reduced to:

$$L_\sigma di_{1a}/dt_A = u_{1a} \quad (3)$$

Under these presuppositions it is therefore possible to calculate the total leakage inductance from the derivation of the current and the motor voltage. Now, in order to avoid the aforementioned errors of the pulse-controlled inverter in the low voltage range, the machine must be fed here with a high voltage in the range $> 100$ V, so that the actually set voltage corresponds to the desired value. Since the current can then also rise very rapidly, the duration of the measurement is short (compared to the rotor time constant), so that the condition $\Psi_{2a}' = 0$, is approximately fulfilled. In order to satisfy the other condition $i_{1a} = 0$, the measurement is conducted at the zero crossing point of the current.

Figure 2:
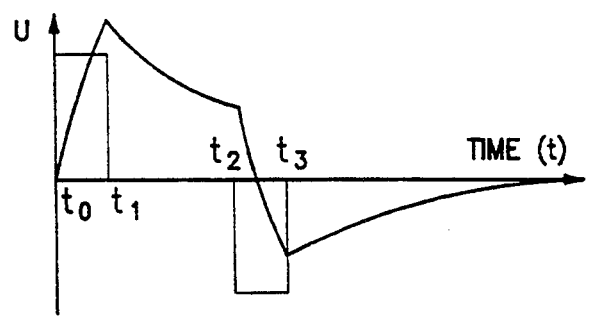
FIG. 2 is a graph of stator current and voltage waveforms used in the identification of an induction motor total leakage inductance $L_\sigma$.

A possibility for the practical realization of the measurement is the waveform of the applied voltage and motor current resulting from it, as shown in FIG. 2.

At time $t_0$ a positive voltage is applied to the machine in the a direction. At time $t_1$ the current has reached a preset limit, which depends on the rated current of the motor and is limited 0.5 $I_{rated}$ for safety reasons. Then the voltage is lowered to 0 and the machine current discharges itself via the intermediate capacitor of the frequency converter. The voltage increase at the capacitor can be calculated from the energy absorbed:

absorbed energy of the machine: $E = 0.5 i^2 L$
absorbed energy of the capacitor: $E = 0.5(U+dU)^2 C$ For a no-load intermediate circuit voltage $U = 540$ V and a total leakage inductance of 30 mH maximum with the machines employed here and $C = 1$ mF, a voltage rise $Ud = 2.78$ V $= 0.5\%$ results, which can be tolerated.

Then at time $t_2$, a negative voltage $U_a$ is applied to the machine. The current ia falls to another preset negative limit value. Then the voltage is set to zero again, the inductor discharges, and the identification of the total leakage inductance is finished.

Between times $t_2$ and $t_3$, the zero crossing point of the motor current is detected. For a certain time interval dt around this zero crossing point, the slope of the motor current is determined and from it the total leakage inductance:

$$L_\sigma = U_1 dt/di_1$$

This invention describes an identification algorithm to receive the remaining parameters $R_1$, $\sigma_2$, and $L_R$. The algorithm works when all stator voltages and stator currents of the motor are in steady state. That the stator currents and voltages are steady state values can be assured by merely applying them and waiting a time expected to be sufficient for any transients to die out.

Identification of Remaining Parameters

A frequency converter offers the possibility of presetting the voltage phaser according to magnitude and orientation. An output frequency converter ac voltage $U_{1a}$ of frequency $\omega$, of the type required for the identification procedure, can thus be achieved by an appropriate variation of the rated voltage phaser fed to the frequency converter. Effects (minimal turn-on time, dead times) occurring in the frequency converter, however, lead to a phase shift of the fundamental wave of the actually set output voltage versus the required nominal value. At low voltages, this phase shift can reach 5°–10° for the frequency converter studied here. Thus, it is once again not possible to enlist the nominal voltage value as a reference for the identification.

Figure 3:
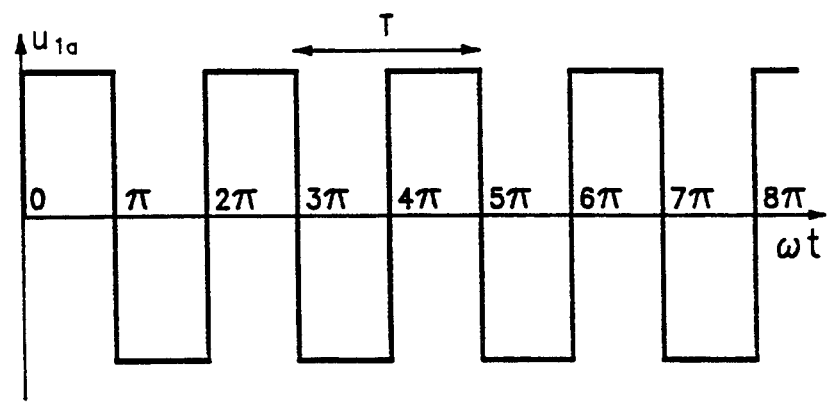
FIG 3 is a graph of stator voltage used in the identification of rotor time constant $\tau_2$, rotor resistance $R_1$, and a parameter $L_R$.

One solution of the problem is to feed the machine with square-waves rather than the sinusoidal voltage $u_{1a}$, as is shown by FIG. 3.

A rectangular stator voltage $u_{1a}$ as shown in FIG. 3 is supplied to the motor during standstill. The other stator voltage component $U_{1b}$ is set to zero so that the motor does not produce any torque and remains motionless. The stator voltage curve consists of a fundamental frequency $\omega$ and harmonic frequencies. $\omega$ can be derived from the period T (see FIG. 3):

$$\omega = 2\pi/T.$$

Figure 4:
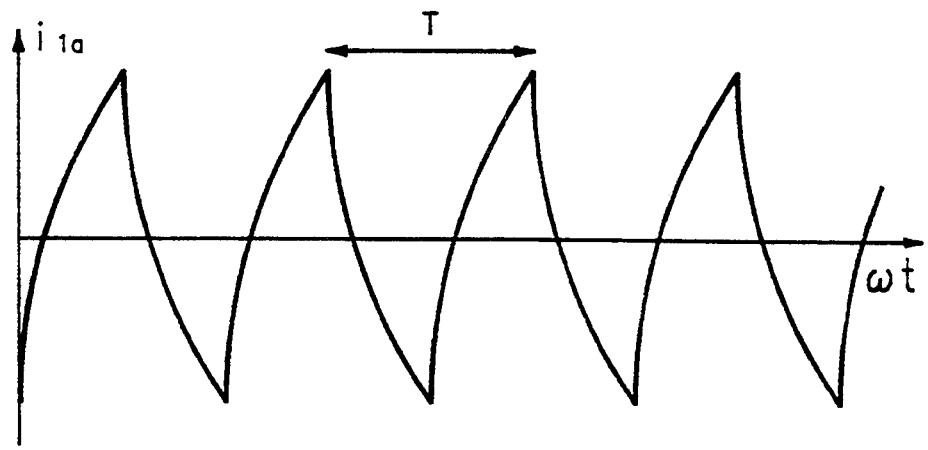
FIG. 4 is a graph of stator current used in the identification of rotor time constant $\tau_2$, rotor resistance $R_1$, and a parameter $L_R$.

FIG. 4 shows the motor stator current $i_{1a}$ which follows from the stator voltage $u_{1a}$ in FIG. 3. The curve of stator current $i_{1a}$ consists of increasing and decreasing exponential functions according to positive or negative $u_{1a}$.

Figure 5:
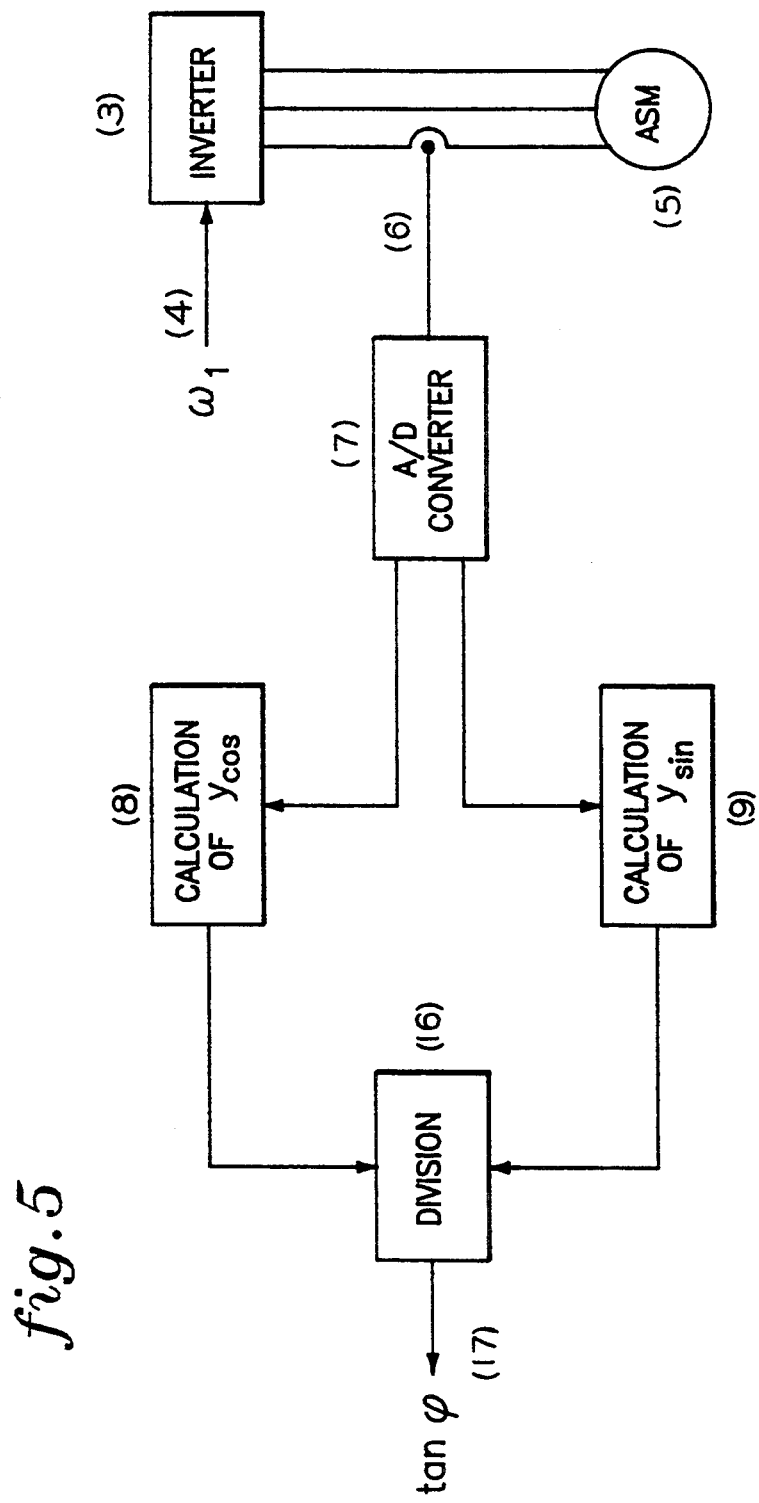
FIG. 5 is a block diagram of a circuit for getting tangent $\phi$.

FIG. 5 shows a part of the invention which computes tan $\phi$. The angle $\phi$ means the phase angle between the fundamental frequencies of motor stator voltage and stator current. Tan $\phi$ is used for further parts of the invention. An inverter 3 supplies the desired stator voltage in response to a fundamental frequency $\omega_1$ on a line 4, to the induction motor 5. The stator voltage is the same as shown in FIG. 3. The motor stator current 6 is sampled during one period T with the help of an A/D converter 7 and then fed to block 8 and 9. Block 8 calculates a value $Y_c$ according to the equation:

$$y_c[k+1] = y_c[k] + i_{1a}[k] * \sin(2\pi k * t_{clock}/T) * t_{clock} \quad (4)$$

In this equation (4) $i_{1a}[k]$ is a sampled value of $i_{1a}$. The next value sampled is $i_{1a}[k+1]$ and so on. The first value is $i_{1a}[0]$; the last value is $i_{1a}[T/t_{clock}-1]$. The output of block (8) is $Y_{cos}$. It equals the last value of $Y_c$:

$$Y_{cos} = Y_c[T/t_{clock}] \quad (5)$$

Thus, equations (4) and (5) are the discrete form of the time continuous equation:

$$Y_{cos} = T \int_0 i_{1a}(t) \sin(\omega t) dt = i_{fund} \pi \cos \phi \quad (6)$$

$i_{fund}$: amplitude of the fundamental frequency of $i_{1a}(t)$
The derivation of (6) is as follows:
Block 9 calculates a value $Y_{sin}$ similar to the operation in block 8, equations (4)–(6):

$$Y_S[K+1] = Y_S[k] * \cos(2\pi k * t_{clock}/T) * t_{clock} \quad (7)$$

$$Y_{sin} = Y_S[T/t_{clock}] \quad (8)$$

$$Y_{sin} = T \int_0 i_{a1}(t) \cos(\omega t) di = i_{fund} \pi \sin \phi \text{ (time continuous)} \quad (9)$$

Block 16 performs a division. It computes tan $\phi$ (10) according to:

$$\tan \phi = \frac{y_{sin}}{y_{cos}} = \frac{i_{fund} \pi \sin \phi}{i_{fund} \pi \cos \phi} \quad (11)$$

Figure 6:
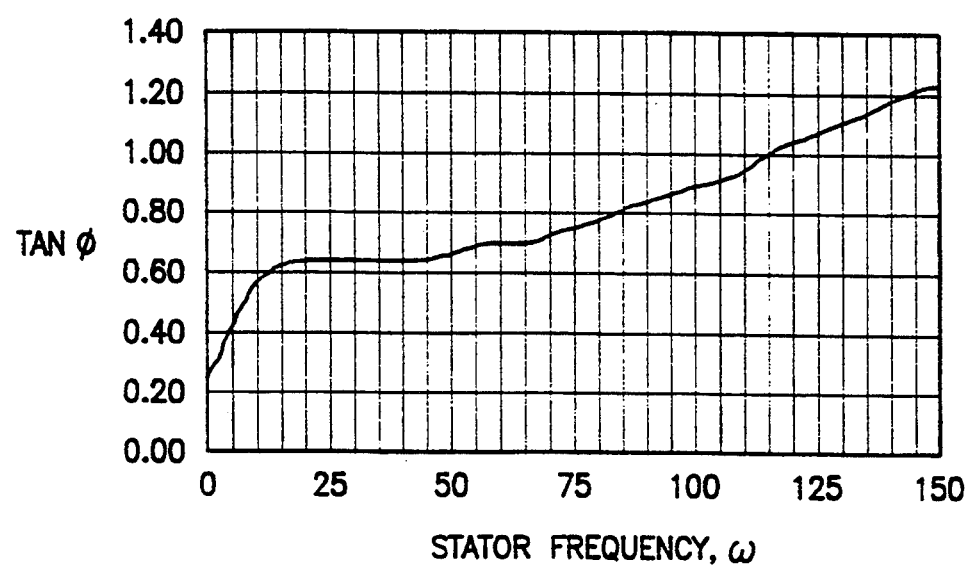
FIG. 6 is a graph of tangent $\phi$ v. stator frequency $\omega$.

See FIG. 6. The whole procedure is performed n times where n is the number of samples each time a stator voltage curve as described in FIG. 1 is fed to the motor. The value of the fundamental frequency $\omega$ is varied each time. So the result of all repetitions is a set of n pairs of the fundamental frequency $\omega$ and the appropriate value of tan $\phi$:

$$\text{Result} = \begin{vmatrix} \omega_1 \cdot \tan \phi_1 \\ \omega_2 \cdot \tan \phi_2 \\ \cdot \\ \cdot \\ \cdot \\ \omega_n \cdot \tan \phi_n \end{vmatrix} \quad (12)$$

The following section of the disclosure shows the algorithm which estimates the missing motor parameters $R_1$, $L_R$, $\sigma_2$ by using the measured values $L_\sigma$ and equation (12). In case of steady state, a complex stator impedance $Z(\omega)$ can be derived from the motor model of equations (1) and (2):

$$u_{1a}/i_{1a} = Z(\omega) = R(\omega) + jX(\omega) = |Z(\omega)|e^{-j\phi} \quad (13)$$

The real and imaginary components of impedance $Z(\omega)$ are as follows:

$$R(\omega) = R_1 + \omega^2 L_R/N(\omega)$$
$$X(\omega) = \omega L_\sigma + \omega L_R/(T_2 N(\omega))$$
with
$$N(\omega) = 1 + \omega^2 T_2^2$$

$$Z(\omega) = |Z(\omega)|e^{-j\phi}$$
$$= > Z(\omega)e^{j\phi} = |Z(\omega)|$$
$$= > Im\{Z(\omega)e^{j\phi}\} = 0$$

where Im identifies the imaginary part.
Additional transformations yield:

$$Im\{R(\omega) + jX(\omega)\}(\cos\phi + j\sin\phi) = 0 \quad | \quad :\cos\phi$$
$$Im\{R(\omega) + jX(\omega)\}(1 + j\tan\phi)\} = 0$$
$$= > R(\omega) \tan \phi + X(\omega) = 0$$

The imaginary part of the impedance's amount $|Z(\omega)|$ equals zero (the amount is a real number):

$$Im\{|Z(\omega)|\} = Im\{Z(\omega)e^{j\phi}\} = 0 \quad (15)$$

Equation (13) is now inserted into (14) and $R(\omega)$ and $X(\omega)$ are replaced by the parameters of (1) and (2): The result is the non-linear equation $$R(\omega) \tan \phi + X(\omega) = (\tan \phi)R_1 + \omega^2(\tan \phi)(R_1 T_2^2 + L_R) + \omega^3 L_\sigma T_2^2 + \omega L_R/T_2 + \omega L_\sigma = 0 \quad (15)$$

This equation 15 is obtained as follows:

$$L_\sigma \frac{di_{1a}}{dt} = -\left(R_1 + \frac{L_R}{T_2^2}\right)i_{na} + \frac{1}{T_2}\psi_{2a}' + U_{1a}$$
$$\frac{d\psi_{2a}'}{dt} = \frac{L_R}{T_2^2} i_{1a} - \frac{1}{T_2} \psi_{2a}' \quad \bigg\} \quad (1)$$

Substitution $\frac{d}{dt} \rightarrow j\omega$ $$1 \quad L_\sigma j\omega i_{1a} = -\left(R_1 + \frac{L_R}{T_2^2}\right)i_{1a} + \frac{1}{T_2}\psi_{2a}' + U_{1a}$$
$$2 \quad j\omega \psi_{2a}' = \frac{L_R}{T_2^2} i_{1a} - \frac{1}{T_2} \psi_{2a}' \quad \bigg\} \quad (1)$$

$$2 \quad \left(j\omega + \frac{1}{T_2}\right)\psi_{2a}' = \frac{L_R}{T_2^2} i_{1a}$$

$$2 \quad \boxed{\psi_{2a}' = \frac{L_R}{j\omega T_2^2 + T_2} i_{1a}} \quad 3$$

$$3 \quad jL_\sigma \omega i_{1a} = -\left(R_1 + \frac{L_R}{T_2^2}\right)i_{1a} + \frac{L_R}{j\omega T_2^3 + T_2^2} i_{1a} + U_{1a}$$

$$i_{1a}\left(j\omega L_\sigma + R_1 + \frac{L_R}{T_2^2} - \frac{L_R}{j\omega T_2^3 + T_2^2}\right) = U_{1a}$$

-continued $$i_{1a}\left(j\omega L_\sigma + R_1 + \frac{L_R}{\tau_2^2} - \frac{L_R(1-j\omega\tau_2)}{\tau_2^2(1+\omega^2\tau_2^2)}\right) = U_{ia}$$

$$i_{1a}\left(R_1 + \frac{L_R}{\tau_2^2} - \frac{L_R}{\tau_2^2(1+\omega^2\tau_2^2)} + \right.$$

$$\left. j\left(\omega L_\sigma + \frac{\omega L_R}{\tau_2(1+\omega^2\tau_2^2)}\right)\right) = U_{ia}$$

$$i_{1a}\left(R_1 + \frac{L_R(1+\omega^2\tau_2^2) - L_R}{\tau_2^2(1+\omega^2\tau_2^2)} + \right.$$

$$\left. j\left(\omega L_\sigma + \frac{\omega L_R}{\tau_2(1+\omega^2\tau_2^2)}\right)\right) = U_{1a}$$

$$i_{1a}\left(\underbrace{R_1 + \frac{\omega^2 L_R}{1+\omega^2\tau_2^2}}_{=R(\omega)} + j\underbrace{\left(\omega L_\sigma + \frac{\omega L_R}{\tau_2(1+\omega^2\tau_2^2)}\right)}_{=X(\omega)}\right) = U_{1a}$$

Substitute $R(\omega)$ and $X(\omega)$ in Equation 15:

(15): $R(\omega) \cdot \tan\phi + X(\omega) = 0$ $$R(\omega) = R_1 + \frac{\omega^2 L_R}{1+\omega^2\tau_2^2} \; ; \; X(\omega) = \omega L_\sigma + \frac{\omega L_R}{\tau_2(1+\omega^2\tau_2^2)}$$

$$R_1\tan\phi + \frac{\omega^2 L_R}{1+\omega^2\tau_2^2}\tan\phi + \omega L_\sigma + $$

$$\frac{\omega L_R}{\tau_2(1+\omega^2\tau_2^2)} = 0 \Big| \cdot (1+\omega^2\tau_2^2)$$

$R_1\tan\phi(1+\omega^2\tau_2^2) + \omega^2 L_R\tan\phi + \omega L_\sigma(1+\omega^2\tau_2^2) + \omega L_R/\tau_2 = 0$ $R_1\tan\phi + \omega^2\tau_2^2 R_1\tan\phi + \omega^2 L_R\tan\phi + \omega L_\sigma + $ $$\omega^3\tau_2^2 L_\sigma + \omega L_R/\tau_2 = 0$$

$$\boxed{R_1\tan\phi + \omega^2\tan\phi(R_1\tau_2^2 + L_R) + \omega^3 L_\sigma\tau_2^2 + \omega\frac{L_R}{\tau_2} + \omega L_\sigma = 0}$$

This is Equation 15.

This equation can be written for the n working points in (12). The result is the following set of n non-linear equations (16):

$$f(R_1,L_R,\tau_2) = \begin{pmatrix} (\tan\phi_1)R_1 + \omega_1^2(\tan\phi_1)(R_1\tau_2^2 + L_R) + \omega_1^3 L_\sigma\tau_2^2 + \omega_1 L_R/\tau_2 + \omega_1 L_\sigma \\ (\tan\phi_2)R_1 + \omega_2^2(\tan\phi_2)(R_1\tau_2^2 + L_R) + \omega_2^3 L_\sigma\tau_2^2 + \omega_2 L_R/\tau_2 + \omega_2 L_\sigma \\ \vdots \\ (\tan\phi_n)R_1 + \omega_n^2(\tan\phi_n)(R_1\tau_2^2 + L_R) + \omega_n^3 L_\sigma\tau_2^2 + \omega_n L_R/\tau_2 + \omega_n L_\sigma \end{pmatrix} = \begin{pmatrix} 0 \\ 0 \\ \vdots \\ 0 \end{pmatrix} \quad (16)$$

In this equation set (16), the parameters $L_\sigma$, $\tan\phi$ and $\omega$ are known and the parameters $R_1$, $L_R$ and $\tau_2$ are missing. The missing parameters have to fulfill equation (16). In practice, it is not possible to reach the condition (16) $f(R_1, L_R, \tau_2) = 0$ exactly because of measuring errors of $L_\sigma$ and $\tan\phi$. It is not only measurement interference which plays a part here, but also the omissions made in setting up the machine model. Therefore, the missing parameters should not fulfill (16) exactly; rather, they should approximate it. A criterion for a good approximation is the minimization of the square of $f(R_1, L_R, \tau_2)$ (least squares method):

$$h(R_1,L_R,\tau_2) = 0.5*(f(R_1,L_R,\tau_2))^T * f(R_1,L_R,\tau_2) = Min \quad (17)$$

The least squares method gives an iteration instruction to calculate a new parameter set $(R_1,L_R,\tau_2)[k+1]$ out of the last parameter set $(R_1,L_R,\tau_2)[k]$. The algorithm converges upon the missing parameters $R_1, L_R, \tau_2$ if the estimated start value $(R_1,L_R,\tau_2)[0]$ is a sufficiently good approximation of $R_1, L_R, \tau_2$.

Figure 7:
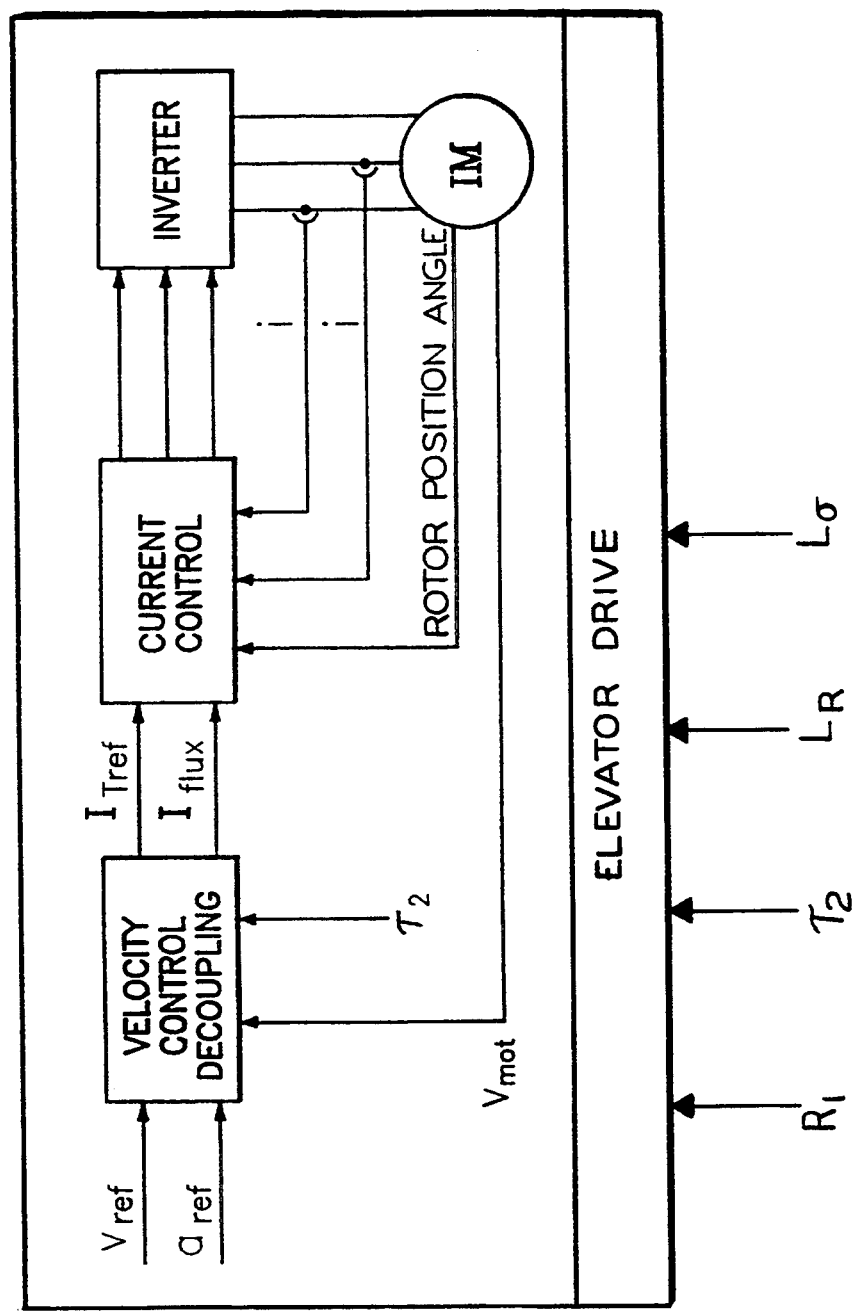
FIG. 7 is a block diagram of a vector controlled induction motor.

The parameters are supplied to an elevator motor drive, FIG. 7. For a vector control, the rotor time constant is supplied to a velocity control.

It should be understood by those skilled in the art that various changes, omissions, and additions may be made herein without departing from the spirit and scope of the invention.

I claim:

1. A method of operating a three phase induction motor which is driven by an inverter, said inverter operating in response to a controller as a function of the total leakage inductance of the motor, the stator resistance of the motor, the main inductance of the motor and the time constant of the rotor of the motor, comprising:

(a) providing pulses of alternating polarity voltage, each pulse having a duration which is less than said time constant, to one phase of the stator of the motor and measuring the resulting rate of change of stator current with respect to time at a point in time when the stator current crosses zero;

(b) providing, in response to the magnitude of said pulses of voltage and said rate of change of stator current, a leakage inductance signal indicative of the total leakage inductance of the motor;

(c) providing a square wave voltage of a first frequency to one stator voltage input of said motor, while providing zero voltage to the other stator voltage input of said motor, and measuring the resultant steady state current to said stator;

(d) providing, in response to said square wave voltage and said steady state current in said stator, a tangent signal indicative of the tangent of the phase angle between said steady state current and said square wave voltage;

(e) repeating steps (c) and (d) at least twice at additional frequencies different from each other and different from said first frequency, to provide corresponding tangent signals indicative of the tangent of the phase angle between the related current and voltage;

(f) in response to said leakage inductance signal, signals indicative of said first frequency and said additional frequencies, and said tangent signals, providing a resistance signal indicative of an approximation of the resistance of the stator of said motor, a total inductance signal indicative of an approximate relationship between the main inductance of the rotor and the resistance of the rotor of the motor, and a time constant signal indicative of an approximation of the time constant of said rotor;

(g) establishing motor control parameters in said controller in response to said leakage inductance signal, said resistance signal, said total inductance signal, and said time constant signal; and (h) causing said controller to operate said inverter to drive said motor.

2. A method according to claim 1 in which said step (e) includes step-wise integration of samples of said steady state current over a measurement time period.

3. A method according to claim 1 in which said step (f) includes expressing, for each of said frequencies, the relationship of all of said signals corresponding to each frequency in an equation, and solving said equations simultaneously.

4. A method according to claim 3 in which said step (f) includes solving said equations simultaneously by a method of least squares.

5. A method according to claim 1 in which said motor is an elevator motor.

* * * * *